3,533,907
**METHOD OF FORMING WATER-LAID VERMICU-
LITE ROOF INSULATION BOARD**
Antoine Kawam, Silver Spring, and Michael V. Ernest,
Baltimore, Md., assignors to W. R. Grace & Co., New
York, N.Y., a corporation of Connecticut
No Drawing. Filed Mar. 27, 1967, Ser. No. 625,937
Int. Cl. D21h 3/06, 3/66
U.S. Cl. 162—145  3 Claims

ABSTRACT OF THE DISCLOSURE

A thermal water repellent insulation board, prepared from water-repellent (asphalt coated) exfoliated vermiculite and cellulosic fibers binded together with asphalt.

---

This invention related to insulation materials. In one particular aspect it relates to fire-resistant, low density insulation board consisting of water-proof vermiculite and wood fibers.

U.S. Pat. 3,042,578 discloses an insulating product consisting essentially of expanded perlite held together by a network of wood fibers. The perlite granules act as particles and pack up with contact only in limited areas leaving sufficient opening to allow the perlite mass to receive the fiber network. The fiber network holds the structure together without impairing rapid dewatering.

Exfoliated vermiculite, with its accordian-like shape, offers a multitude of contacting flat faces and lamina which in principle would lend itself to the preparation of a stronger board due to the interlocking of the particles. However, exfoliated vermiculite, unlike perlite, not only holds water; but the interlocking particles also prevents dewatering and hence, cannot be used in the preparation of fiber and insulation boards.

It is therefore an object of this invention to prepare an exfoliated vermiculite-wood fiber insulation board that does not hold water, is rapidly dewatered and possesses a high internal strength. These and other objects of the invention will become apparent from the following detailed description and specific examples.

Briefly, this invention consists of a thermal insulation board which is molded from an aqueous slurry of particles of water-repellent exfoliated vermiculite and cellulosic fibers bonded together with a suitable binder.

The vermiculite used is asphalt coated exfoliated vermiculite. This is prepared by heating the vermiculite ore above 1500° F. at which temperature it exfoliates, then as the red hot particles are discharged from the exfoliating apparatus they are sprayed with dilute asphalt emulsion. Flashing of water and other volatiles occurs rapidly leaving a hydrocarbon bituminous coating on the exfoliated vermiculite. This product is an article of commerce known as masonry fill exfoliated vermiculite and is manufactured by the Zonolite Division of W. R. Grace & Co. A preferred asphalt coated vermiculite is No. 5 masonry fill grade.

The wood fibers of this invention are those commonly used in making hardboard and fiberboard products.

The ratio of wood fibers to water-repellent vermiculite is dependent upon the end properties desired in the finished board. An increase in the vermiculite content gives a corresponding increase in fire-resistant and insulation qualities; while increasing the wood fiber results in decreased fire-resistance, but increased strength.

Various binders may be used depending on the uses and desired properties of the end product. Among those which may be used are bituminous emulsion, phenolics, aminoplasts and the like. The preferred binding agent is asphalt deposited in the form of an emulsion.

It is a critical feature of this invention that the exfoliated vermiculite shall have been previously waterproofed before it is slurried with the wood fibers and asphalt emulsion. If exfoliated vermiculite is slurried and treated with asphalt emulsion without having been previously waterproofed, no dewatering will take place.

The insulating boards prepared in the practice of this invention can be modified further by the addition of chrysotile asbestos open to colloidal dimensions. Asbestos adds the additional desirable properties of strength and fire-resistance.

In a preferred embodiment of this invention, wood fibers are dispersed in water and a 50% asphalt emulsion added with continuous mixing. Waterproof (asphalt coated) vermiculite is added to the slurry. A mat is prepared from the slurry by dewatering in a forming box after which the mat is dried to obtain a rigid, thermally insulating board.

In another embodiment colloidal asbestos fibers can be added to the wood fiber water dispersion to increase the strength and fire resistance of the resulting board.

This invention is illustrated but not limited by the following specific examples.

EXAMPLE I

|  | Percent by weight |
|---|---|
| Wood fiber (hardboard and fiberboard grade) | 35 |
| Chrysotile asbestos—colloidal grade from Coalinga, Calif. | 10 |
| Asphalt coated vermiculite [1] | 50 |
| Asphalt emulsion (50%) | 5 |

The asbestos and the wood fibers were dispersed in water the pH adjusted to 4.5 to 5 with HCl and agitated for 15 minutes. The asphalt emulsion was then added with mixing continued for 5 minutes followed by addition of the coated vermiculite. The mixing at this point must be very efficient; common pulping equipment is very adequate.

At this stage the slurry is approximately 2% by weight solids (the amount of water introduced at the start is calculated to bring the solids concentration of the slurry at this step to 2%). The slurry is rapidly dewatered in a standard forming box. A mat 1″ x 12″ x 12″ was formed which was dried at 212° F. The resulting rigid board had a density of 10.5 lbs./ft.$^3$, with good thermal insulation and fire resistance.

EXAMPLE II

|  | Percent by weight |
|---|---|
| Wood fiber | 35 |
| Asbestos | 10 |
| Asphalt coated vermiculite [1] | 45 |
| Asphalt emulsion (50%) | 10 |

A board was prepared using the process described in Example I.

EXAMPLE III

|  | Percent by weight |
|---|---|
| Pulped newsprint (old newspapers) | 35 |
| Asbestos | 10 |
| Asphalt coated vermiculite [1] | 50 |
| Asphalt emulsion (50%) | 5 |

A board was prepared using the process described in Example I, with the exception that in this example a 3% slurry was used.

EXAMPLES IV AND V

|  | IV, percent | V, percent |
|---|---|---|
| Pulped newsprint | 35.6 | 35.6 |
| Vermiculite No. 5 masonry fill [1] | 59.7 |  |
| Perlite |  | 58.7 |
| Asphalt emulsion (50%) | 4.7 | 5.7 |

[1] W. R. Grace & Co. Zonolite Div., No. 5 Masonry Fill Grade.

Board IV is the preferred board of this invention.

These two boards were made as follows:

Old newspapers were pulped, and the pulp blended with efficient mixing with either vermiculite or the perlite in a water dispersion (3% total solids). After thorough mixing the asphalt was added and both slurries dewatered on a forming box, followed by drying in the usual way at 212° F.

| Properties | Vermiculite board | Perlite board |
|---|---|---|
| Density, lbs./ft.$^2$ | 10.24 | 12.12 |
| Water absorption | 1.6% | 1.5% |
| K at 145° F. mean temperature | 0.40 | 0.49 |
| Strength | Good | Fair |
| Uniformity | Very good | Do. |
| Rate of dewatering | Good [1] | Good |
| Water absorption | 1.66% | 1.50% |
| Modulus of Rupture | 88.8 lbs./in.$^2$ | 80.0 lbs./in.$^2$ |
| Thermal Conductivity [2]: | | |
| "K" at a mean temperature of 65.6° F | 0.339 B.t.u., in./hr., ft.$^2$ -°F. | |
| "K" at a mean temperature of 66.3° F | | 0.349 B.t.u., in./hr, ft.$^2$ -°F. |

[1] Faster than perlite board.

Slurries prepared as in Example I using non-coated exfoliated vermiculite failed to dewater.

We claim:

1. A process for preparing a fibrous vermiculite board which comprises the steps of:
    (a) exfoliating vermiculite by heating to a temperature of about 1500° F.,
    (b) spraying the exfoliated vermiculite with a dilute asphalt emulsion to form a water repellent exfoliated vermiculite,
    (c) forming a slurry of cellulosic or asbestos fibers in an asphalt emulsion.
    (d) mixing said water repellent exfoliated vermiculite with said slurry of cellulosic or asbestos fibers,
    (e) forming a wet mat from said slurry of fibers and exfoliated vermiculite,
    (f) drying the mat.

2. The method of claim 1 wherein the fibers are cellulosic fibers.

3. The method of claim 1 wherein the fibers are asbestos fiber and cellulosic fiber.

References Cited

UNITED STATES PATENTS

| | | | |
|---|---|---|---|
| 1,905,541 | 4/1933 | Wiener et al. | 162—159 |
| 2,175,715 | 10/1939 | Denning | 162—181 |
| 2,626,864 | 1/1953 | Miscall et al. | 162—153 X |
| 3,257,267 | 6/1966 | Hay | 162—183 X |

S. LEON BASHORE, Primary Examiner

F. FREI, Assistant Examiner

U.S. Cl. X.R.

161—162, 163; 162—153, 155, 171, 181, 185